US006402209B2

(12) United States Patent
McGuiness

(10) Patent No.: US 6,402,209 B2
(45) Date of Patent: Jun. 11, 2002

(54) ENERGY ABSORBING DEVICE

(75) Inventor: Mark McGuiness, Carseldine (AU)

(73) Assignee: TJM Products PTY, Ltd., Geebung (AU)

( * ) Notice: Subject to any disclaimer, the term of this patent is extended or adjusted under 35 U.S.C. 154(b) by 0 days.

(21) Appl. No.: 09/747,637

(22) Filed: Dec. 21, 2000

(51) Int. Cl.[7] ................................................ B60R 19/39
(52) U.S. Cl. ........................ 293/133; 296/189; 188/371
(58) Field of Search ................................ 293/132, 133, 293/102, 120; 296/188, 189; 188/371, 377

(56) References Cited

U.S. PATENT DOCUMENTS 3,997,207 A * 12/1976 Norlin
4,029,350 A * 6/1977 Goupy et al.
4,431,221 A * 2/1984 Jahnle .................... 293/132 X
5,876,078 A * 3/1999 Miskech et al. ............ 293/133
5,984,390 A * 11/1999 Kemp et al. ................ 296/132
6,227,582 B1 * 5/2001 Ichien ........................ 296/132

FOREIGN PATENT DOCUMENTS

| | | |
|---|---|---|
| AU | B-11493/95 | 1/1995 |
| AU | 199855355 B2 | 2/1998 |

* cited by examiner

*Primary Examiner*—Joseph D. Pape
(74) *Attorney, Agent, or Firm*—Oppenheimer Wolff & Donnelly LLP; Claude A. S. Hamrick

(57) ABSTRACT

A device for interconnecting a protective bar and a vehicle, the device including a first connection component which is adapted to be connected to a protective bar, second connection components which are adapted to be connected to a vehicle and an impact absorbing component which is adapted to at least partially absorb energy associated with an impact on the protective bar which is to be connected to the first connection component, wherein the impact absorbing component includes spaced lateral walls and a generally hollow member located there-between.

30 Claims, 2 Drawing Sheets

ENERGY ABSORBING DEVICE

FIELD OF THE INVENTION

The present invention relates primarily to protective bars known as bullbars and a device used to mount them to a vehicle.

BACKGROUND OF THE INVENTION

A conventional way of mounting a bullbar to a vehicle involves the use of mounting brackets which at one end are connected to the chassis of a vehicle underneath the vehicle bumperbar and at the other end are connected to the bullbar.

The problem with existing mounting brackets is that they are not specifically adapted to do anything other than hold the bullbar in place. If the bullbar is hit by something the bullbar is suppose to absorb all of the impact and prevent transferal of any significant impact to the vehicle itself.

SUMMARY OF THE INVENTION

The present invention is aimed at improving the energy absorbing characteristics of a vehicle having a protective bar, by providing a device that is able to mount a bullbar and at the same time is able to absorb energy associated with an impact on the bullbar.

According to the present invention there is provided a device for interconnecting a protective bar and a vehicle, the device including a first connection means which is adapted to be connected to a protective bar, a second connection means which is adapted to be connected to a vehicle and an impact absorbing means which is adapted to at least partially absorb energy associated with an impact on the protective bar which is to be connected to the first connection means, wherein the impact absorbing means includes spaced lateral walls and a generally hollow member located there-between.

Preferably the lateral walls define a partial enclosure in which a major part of the generally hollow member is located.

The hollow member preferably comprises a tubular member.

The hollow member may be cylindrical in shape.

Alternatively the hollow member is oblong, square, rectangular or any other geometrical shape in cross section.

The hollow member may be a pipe.

The hollow member preferably has internal walls for strengthening purposes.

The hollow member may have a longitudinal axis which is oriented substantially perpendicular to a longitudinal axis of the device.

Preferably the hollow member has at least one internal wall extending between opposing inner wall surfaces of the impact absorbing means.

Preferably the device has the first connection means located at a front end and the second connection means located at a rearward end, with the impact absorbing means spaced lateral walls extending rearwardly from the front end.

It is preferred that the hollow member is connected to the lateral walls.

The hollow member may be welded to inner surfaces of the lateral walls.

Preferably the lateral walls include diverging first sections.

Preferably the lateral walls include converging second sections.

The first and second sections preferably form an enclosure in which the hollow member is located.

The first and second sections preferably are separated by respective bends.

The impact absorbing means may include a series of first and second sections.

It is preferred that the impact absorbing means includes axially extending lateral walls which each have a zigzag shape.

It is preferred that the impact absorbing means includes a pair of spaced lateral walls having a symmetric configuration with respect to a longitudinal axes of the device.

The impact absorbing means may include a top section comprising an inclined wall which extends at least partially over the hollow member.

The inclined wall may be located within the space between the two lateral walls.

Alternatively the top section may include a top wall which overlaps the lateral walls on either side thereof. The inclined wall may be arranged substantially symmetrically between the diverging first sections.

The inclined wall may be connected to inner surfaces of the diverging first sections.

The inclined wall may extend downwardly from a rearward end to a forward end.

The forward end of the inclined wall may comprise an apex.

The inclined wall may be triangular in shape.

Preferably the inclined wall rearward end extends into a generally flat top wall section.

The flat top wall section may be generally horizontally disposed.

A forward end of the flat top wall section preferably extends over the hollow member.

It is preferred that the forward end of the flat top wall section extends over the converging second section.

The rearward end of the inclined wall preferably commences approximately half way across the hollow member.

The inclined wall and forward end of the flat top wall section may be connected to the top of the hollow member.

The inclined wall may dip below the top edge of the walls of the diverging first section.

The top wall may be planar.

The lateral walls may be planar.

It is preferred that the diverging first section comprises lateral wall sections that have converging top and bottom edges.

The converging second section(s) preferably includes wall sections of generally constant height.

The lateral walls may comprise lateral bends which separate the diverging first section(s) from the converging second section(s).

The lateral walls preferably comprise a rearward section extending rearwardly from the converging second section(s).

The rearward section may comprise rearwardly extending outwardly angled walls and substantially parallel walls.

The lateral walls preferably comprise a plurality of converging and diverging walls.

The lateral walls are preferably arranged symmetrically.

It is preferred that the lateral walls comprise a plurality of side corrugations.

The lateral walls may be adapted to be collapsible when absorbing an axially applied force to a front-end thereof.

It is preferred that the lateral walls are adapted to concertina upon receiving a large force applied to a forward-end thereof.

The hollow member may be adapted to resist twisting of the lateral members.

According to one embodiment the hollow member is adapted to promote uniform crushing of lateral walls.

According to one embodiment the impact absorbing means comprises a plurality of hollow members arranged axially or side by side.

According to another embodiment the device comprises a plurality of enclosures formed by diverging and converging lateral walls with at least one hollow member located in each of the enclosures which are formed thereby.

The top wall section may be adapted to resist rotation of the device when an impact force is received by a protective bar connected to the first connection means.

It is preferred that the first connection means comprises a forwardly extending member.

The first connection means preferably includes a generally vertically oriented plane arm member.

According to one embodiment the first connection means comprises the plurality of plates which are arranged side by side.

It is preferred that the plurality of plates are connected together.

According to one embodiment the first connection means comprises a protective bar mounting section having a slot at a front edge thereof.

According to one embodiment the lateral walls form an enclosure having a diamond configuration, with one corner of the diamond configuration open.

Preferably the second connection means comprises a plurality of walls of the lateral walls.

The second connection means preferably is located at a rearward end of the lateral walls.

The tubular pipe may contact an inner surface of diverging and converging sections.

It is preferred that a minor part of the tubular pipe peripheral surface protrudes beyond gaps between lateral walls at bends between the converging section and outwardly extending walls of the lateral walls.

The gap is preferably narrower than the diameter of the tubular member.

It is preferred that the top wall extends over the outside of the bends between the converging section and outwardly extending walls.

BRIEF DESCRIPTION OF THE DRAWINGS

A preferred embodiment of the present invention will now be described by way of example only with reference to the accompanying drawings in which.

DETAILED DESCRIPTION OF THE PREFERRED EMBODIMENT

Figure 1:
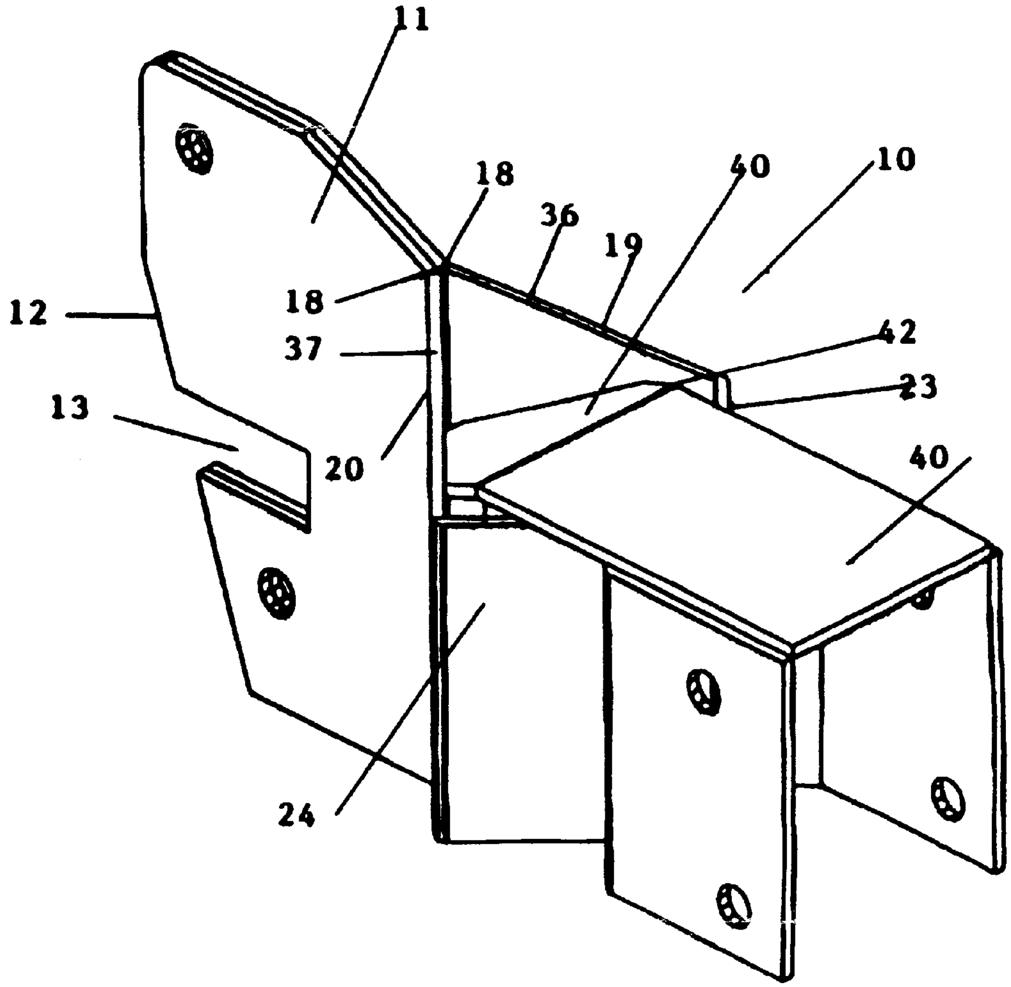
FIG. 1 shows a perspective view of a device for mounting a bullbar to a vehicle in accordance with a preferred embodiment of the present invention.

As shown in FIG. 1 the device 10 consists of a pair of parallel metal plates oriented vertically and welded together. These parallel mounted plates 11 have a front edge 12 which is specifically configured to enable a bullbar to be mounted thereto (using suitable mounting components). Thus the front edge 12 includes an axially oriented slot 13 in a lower mid section thereof.

The parallel plates 11 abut against each other and have a lower straight horizontal edge 14 and an upper edge 15 which is longer and includes a horizontal forward section 16 and a rearward downwardly inclined section 17.

The parallel plates 11 at a rearward end thereof diverge outwardly at a first bend 18, to form diverging lateral walls 19, 20 respectively.

The angle between the diverging walls 19 and 20 is substantially 90° and both walls 19 and 20 diverge outwardly at 45° with respect to a longitudinal axes through the device 10.

The diverging walls 19 and 20 converge inwardly at a second bend 21, 22 and form converging walls 23, 24 respectively.

The converging walls 23 and 24 do not meet but instead have a length approximately ¾ the length of walls 19 and 20 before they bend outwardly at a third bend 25,26 respectively.

Second diverging walls 27, 28 extend from the bends 25, 26 respectively and are oriented at approximately 90° with respect to walls 23, 24. Likewise walls 23 and 24 are angled at approximately 90° with respect to walls 19 and 20.

The second diverging walls 27, 28 at a further bend 29, 30 respectively extend into parallel axially extending walls 31, 30 respectively. These walls 31, 32 constitute the vehicle mounting section at the rearward end of the device 10.

Figure 2:
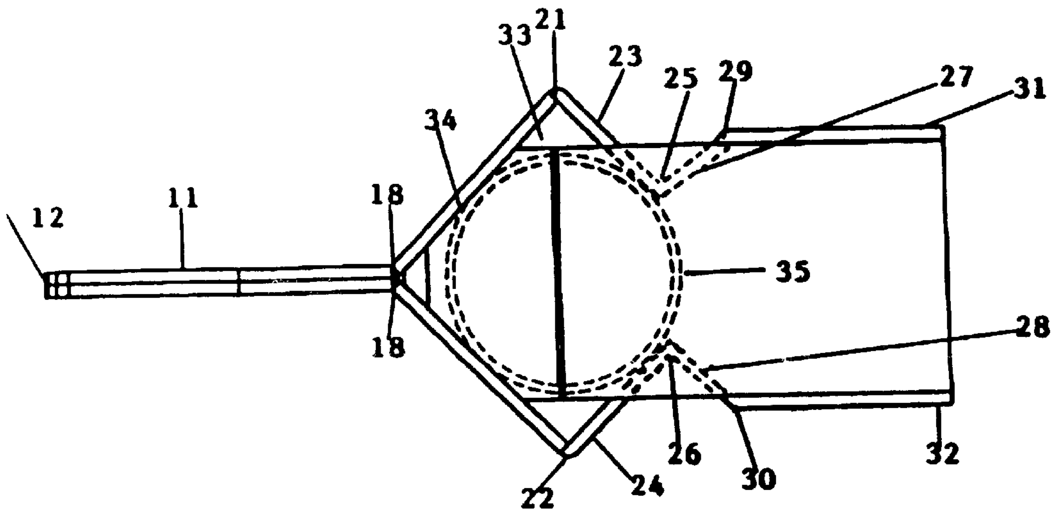
FIG. 2 shows a top view of the device shown in FIG. 1.
Figure 3:
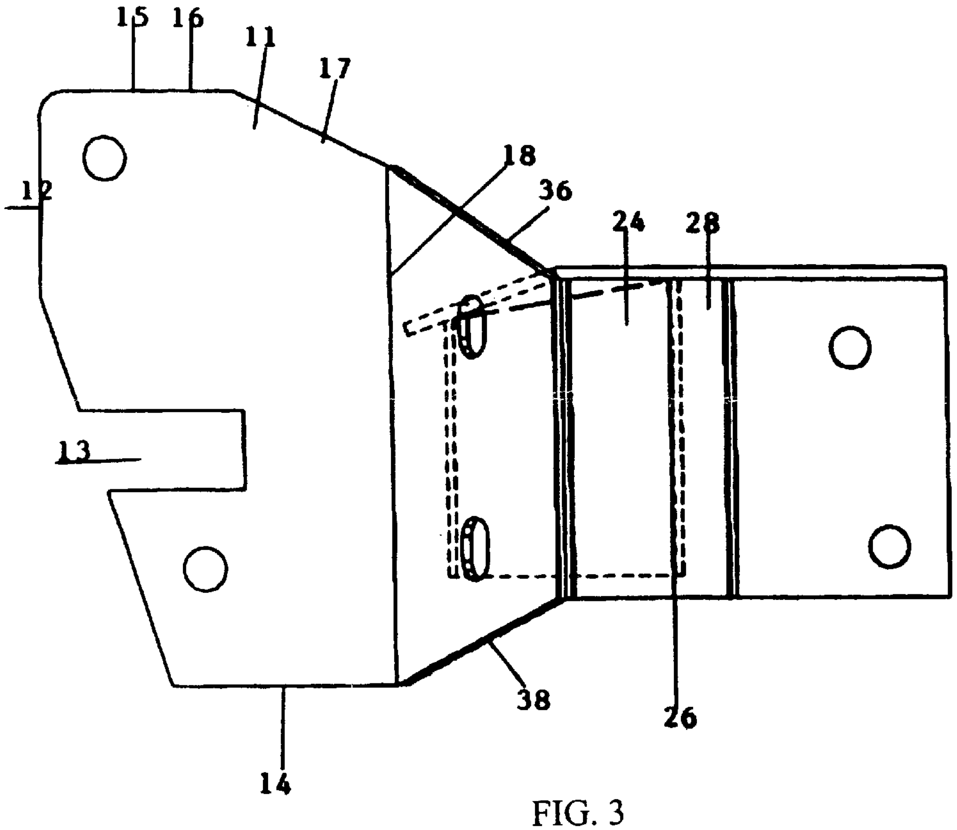
FIG. 3 shows a side view of the device shown in FIG. 1.

As shown most clearly in FIG. 2 walls 19, 20 and 23, 24 form a diamond or square shaped enclosure 33 in which a cylindrical pipe 34 is located and welded to the inner surface of each of the walls 19, 20, 23, 24. The diameter of the metal pipe 34 is sufficient so that it can sit comfortably within the enclosure 33 and abut each of the walls 19, 20, 23, 24.

A rearward most end 35 of the metal pipe 34 protrudes through a gap which exists between opposing bends 25, 26.

It is noted that walls 19 and 20 at their top edges 36, 37 are angled downwardly to the second bends 21, 22. Thereafter the walls 23, 24, 27, 28, 31, 32 have essentially constant height. Similarly lower edges 38, 39 of walls 19, 20 are inclined upwardly to a lesser degree than the downward incline of upper edges 36, 37.

A top metal plate 40 is disposed horizontally over the rearward part of the device and specifically over walls 31, 32, 27, 28 and partly over walls 23, 24 and downwardly and inside the confines of walls 19, 20.

The top plate 40 consists of a rearward horizontal section having the width of the spacing between walls 31 and 32 and terminating at a forward end approximately in line with bends 21 and 22. A downwardly inclined plate section 41 extends from a fold line 42, being a front edge of the horizontal plate section 40. This downwardly inclined plate section 41 has a triangular configuration which approximately matches the inside configuration of diverging walls 19, 20. This plate section 41 is welded to the inner surfaces of walls 19, 20 along its outer edges and also covers the top of the metal pipe 34 which has its top edge effectively cut away to form a beveled front half edge section. Thus a rear half of the metal pipe 34 has a constant height and the front half section has a height which reduces to a front end thereof The angle of the incline for the metal pipe 34 is approximately the same as that for the inclined plate section 41.

The exact location of the bend 42 in the top plate section 40 may be varied along with the downward incline in the metal pipe 34.

It is also noted that the metal pipe is welded through the walls 19, 20 and 23, 24 respectively at preferably 2 points in each wall.

The device described above enable a bullbar to be connected to a vehicle in a manner whereby the device is able to absorb a great deal of any energy which is transmitted to the vehicle as a result of an impact on the bullbar. The configuration of the various components of the device provide a means of controlling the type of compressive forces which are applied to the device as result of an impact on a bullbar connected to the device. Thus as an example the metal pipe 34 which is located within the enclosure 33 in combination with the downwardly extending metal plates 41 and the angles of the walls 19, 20, 23, 24, 27, 28 provide a means of absorbing axially applied forces as well as resisting forces which would tend to create a moment which would rotate the bullbar with respect to the vehicle. Such rotational forces would tend to reduce the effectiveness of an energy absorbing device which was designed specifically to absorb axial forces.

It should be noted however that although the preferred embodiment defines particular features which provide benefits to the inventive concept, the device may be modified by changing various features such as shapes of walls and sections in order to provide alternative devices embodying the same inventive concepts.

What is claimed is:

1. A device for interconnecting a protective bar and a vehicle, the device including a first connection means which is adapted to be connected to a protective bar, a second connection means which is adapted to be connected to a vehicle and an impact absorbing means which is adapted to at least partially absorb energy associated with an impact on the protective bar which is to be connected to the first connection means, wherein the impact absorbing means includes spaced lateral walls and a generally hollow member located there-between.

2. The device as claimed in claim 1 wherein the lateral walls define a partial enclosure in which a major part of the generally hollow member is located.

3. The device as claimed in claim 1 or 2 wherein the hollow member comprises a tubular member.

4. The device as claimed in claim 3 wherein the hollow member is cylindrical in shape.

5. The device as claimed in claim 3 wherein the hollow member as internal walls for strengthening purposes.

6. The device as claimed in claim 3 wherein the hollow member has a longitudinal axis which is oriented substantially perpendicular to a longitudinal axis of the device.

7. The device as claimed in claim 3 wherein the first connection means is located at a front end and the second connection means is located at a rearward end, with the impact absorbing means spaced lateral walls extending rearwardly from the front end.

8. The device as claimed in claim 7 wherein the hollow member is connected to the lateral walls.

9. The device as claimed in claim 8 wherein the lateral walls include diverging first sections.

10. The device as claimed in claim 9 wherein the lateral walls include converging second sections.

11. The device as claimed in claim 10 wherein the first and second sections form an enclosure in which. the hollow member is located.

12. The device as claimed in claim 11 wherein the impact absorbing means includes a top section comprising an inclined wall which extends at least partially over the hollow member.

13. The device as claimed in claim 12 wherein the inclined wall is located within a space between the two lateral walls.

14. The device as claimed in claim 12 wherein the inclined wall is connected to inner surfaces of the diverging first sections.

15. The device as claimed in claim 14 wherein the inclined wall extends downwardly from a rearward end to a forward end.

16. The device as claimed in claim 15 wherein the forward end of the inclined wall is triangular in shape and extends over the hollow member.

17. The device as claimed in claim 16 wherein the inclined wall extends rearwardly into a generally flat top wall section.

18. The device as claimed in claim 17 wherein a forward end of the flat top wall section extends over part of the hollow member.

19. A device for interconnecting a protective bar and a vehicle, the device including a first connection means which is adapted to be connected to a protective bar, a second connection means which is adapted to be connected to a vehicle and impact absorbing means which is adapted to at least partially absorb energy associated with an impact on the protective bar, which is to be connected to the first connection means, wherein the impact absorbing means includes spaced lateral walls and a generally hollow member located therebetween, the lateral walls including diverging first sections and converging second sections.

20. The device as claimed in claim 19 wherein the diverging first section comprises lateral wall sections having converging top and bottom edges.

21. The device as claimed in claim 20 wherein the converging section sections preferably include wall sections of generally constant height.

22. The device as claimed in claim 21 wherein the lateral walls comprise lateral bends which separate the diverging first sections from the converging second sections.

23. The device as claimed in claim 22 wherein the lateral walls include a rearward section extending rearwardly from the converging second sections.

24. The device as claimed in claim 23 wherein the rearward section comprises rearwardly extending outwardly angled walls and substantially parallel walls.

25. The device as claimed in claim 24 wherein the lateral walls are arranged symmetrically.

26. The device as claimed in claim 25 wherein the lateral side walls comprise a plurality of side corrugations.

27. The device as claimed in claim 26 wherein the hollow member is adapted to resist twisting of the lateral members if a large force is applied to a forward end of the device.

28. The device as claimed in claim 26 wherein the first connection means comprises a forwardly extending member comprises a plurality of plates arranged side by side.

29. The device as claimed in claim 28 wherein the first connection means comprises a protective bar mounting section having a slot at a front edge thereof.

30. The device as claimed in claim 29 wherein the second connection means comprises a plurality of walls located at a rearward end of the lateral walls, the rearward walls being generally parallel.

* * * * *